(12) United States Patent
Turner et al.

(10) Patent No.: US 8,602,041 B2
(45) Date of Patent: *Dec. 10, 2013

(54) VEHICLE SPRAY WASHER WITH LIGHTED SPRAY ARM

(75) Inventors: Barry S. Turner, Novi, MI (US); Thomas E. Weyandt, Northville, MI (US); Jerry Alan Kotrych, Livonia, MI (US)

(73) Assignee: Belanger, Inc., Northville, MI (US)

( * ) Notice: Subject to any disclaimer, the term of this patent is extended or adjusted under 35 U.S.C. 154(b) by 357 days.

This patent is subject to a terminal disclaimer.

(21) Appl. No.: 12/707,777

(22) Filed: Feb. 18, 2010

(65) Prior Publication Data

US 2011/0197922 A1 Aug. 18, 2011

(51) Int. Cl.
*B08B 3/02* (2006.01)

(52) U.S. Cl.
USPC ............ 134/113; 134/123; 134/198; 134/199

(58) Field of Classification Search
None
See application file for complete search history.

(56) References Cited

U.S. PATENT DOCUMENTS

| | | | |
|---|---|---|---|
| 5,266,123 A * | 11/1993 | Brand | 134/26 |
| 5,786,758 A * | 7/1998 | Bullock | 340/539.32 |
| 6,372,053 B1 | 4/2002 | Belanger et al. | |
| RE40,463 E | 8/2008 | Belanger et al. | |
| 7,438,075 B1 * | 10/2008 | Huntington et al. | 134/57 R |
| 2005/0279385 A1 * | 12/2005 | Grier et al. | 134/18 |
| 2006/0157093 A1 * | 7/2006 | Belanger | 134/123 |

FOREIGN PATENT DOCUMENTS

WO  WO2004/072932  *  8/2004

* cited by examiner

*Primary Examiner* — Michael Kornakov
*Assistant Examiner* — Ryan Coleman
(74) *Attorney, Agent, or Firm* — Young Basile Hanlon & MacFarlane PC

(57) ABSTRACT

A spray-type car wash system includes an overhead carriage which can move longitudinally the length of a wash bay. A pair of laterally opposed spray arms depend from the carriage. During vehicle entry into the bay, LED-based lights running down the length of each arm are caused to flash to help the driver center a vehicle between the arms. Cushioning and breakaway features protect the arms from damage. A single-arm system is also disclosed. A double-light, stationary support system is also disclosed.

16 Claims, 3 Drawing Sheets

VEHICLE SPRAY WASHER WITH LIGHTED SPRAY ARM

FIELD OF THE INVENTION

This invention relates to spray-type devices for washing vehicles in a predetermined location and more particularly to a lighting system that provides assistance in navigating a vehicle into that position.

BACKGROUND OF THE INVENTION

It is known to wash a vehicle parked in a bay by means of one or more spray arms which travel around the vehicle while dispensing various chemicals in streams of water. Reissue Pat. No. 40,463 dated Aug. 26, 2008 and assigned to Belanger, Inc. of Northville, Mich. describes such a system. Inverted L-shaped spray arms which depend from an overhead carriage are supplied with water and chemicals for washing and rinsing and are caused to move around the vehicle to wash the outside surfaces thereof.

The system described in the Reissue patent is reasonably tolerant of positioning errors which result in an off-center vehicle; i.e., the system described in the Reissue patent has the capability of lateral as well as longitudinal translation and can, therefore, adjust its travel to the actual centerline of the vehicle regardless of its position in the bay.

Where that lateral adjustment capability is not present, proper positioning of the vehicle becomes more important. Various mechanisms including dangling objects and laser beams which contact the windshields of the vehicle are known as assists to the driver of a vehicle entering, for example, a residential garage. These devices are not always suitable for use in a spray-type car wash for various reasons.

SUMMARY OF THE INVENTION

The present invention provides visual assistance to a driver entering a wash bay to help the driver navigate the vehicle to a predetermined position which may be substantially centrally within a bay. In general, the apparatus aspect of the invention comprises the combination of a wash system having a lighting system to provide a visual cue for centering a vehicle within the envelope of the wash apparatus while entering the bay.

In one embodiment, the wash system uses twin, laterally spaced-apart spray arms and the lighting elements are LEDs which are carried by the spray arms. The lights are arranged so that they can be seen by an incoming vehicle and may be turned on and/or flashed during the entry of the vehicle into the bay as well as during the performance of a car wash operation.

In another embodiment, vertical light strips are attached to stationary poles located on opposite sides of the bay. The light strips are illuminated when a car enters the bay.

In another embodiment, a single depending spray arm may be equipped with lights. This arm may be parked at or near one end of the bay and then moved to a target position near the center of the bay to serve as a centering target as the vehicle enters the bay.

Another alternative is to use one movable arm with lights and another stationary arm with lights and locate them to provide a "goal post" effect.

As hereinafter described, the apparatus invention comprises additional features to prevent damage to the spray arm or arms or light supports such as soft or resilient arm structures and a breakaway joint at the upper end of the vertical portion of each arm to prevent damage in the event of an inadvertent collision between a vehicle and a depending spray arm.

The method aspect of the invention comprises the steps of (a) positioning one or more spray arms in a strategic position relative to a wash system in a bay, and (b) exciting a light or group of lights which can be seen by the driver to illuminate and, preferably, to flash during the entry of the vehicle thereby to help a driver to center a vehicle in the system. A sign tells the driver to STOP when the vehicle has reached the desired position. These steps are normally carried out after an initializing step which simply involves signaling the approach of a vehicle and suitably arming the system.

As also hereinafter described in detail, during the wash and rinse phases, the arms of the twin arm wash system operate in a "butterfly" fashion to travel along and around the exterior of a vehicle parked in the bay. The arms depend pivotally from a carriage which is mounted on longitudinally extending overhead rails which run substantially along the length of the bay; i.e., on the order of 18 to 22 feet. Various means may be used to control the movement of the arms as hereinafter described in detail.

BRIEF SUMMARY OF THE DRAWINGS

The description herein makes reference to the accompanying drawings wherein like reference numerals refer to like parts throughout the several views and wherein.

DETAILED DESCRIPTION OF THE ILLUSTRATIVE EMBODIMENT

Figure 1:
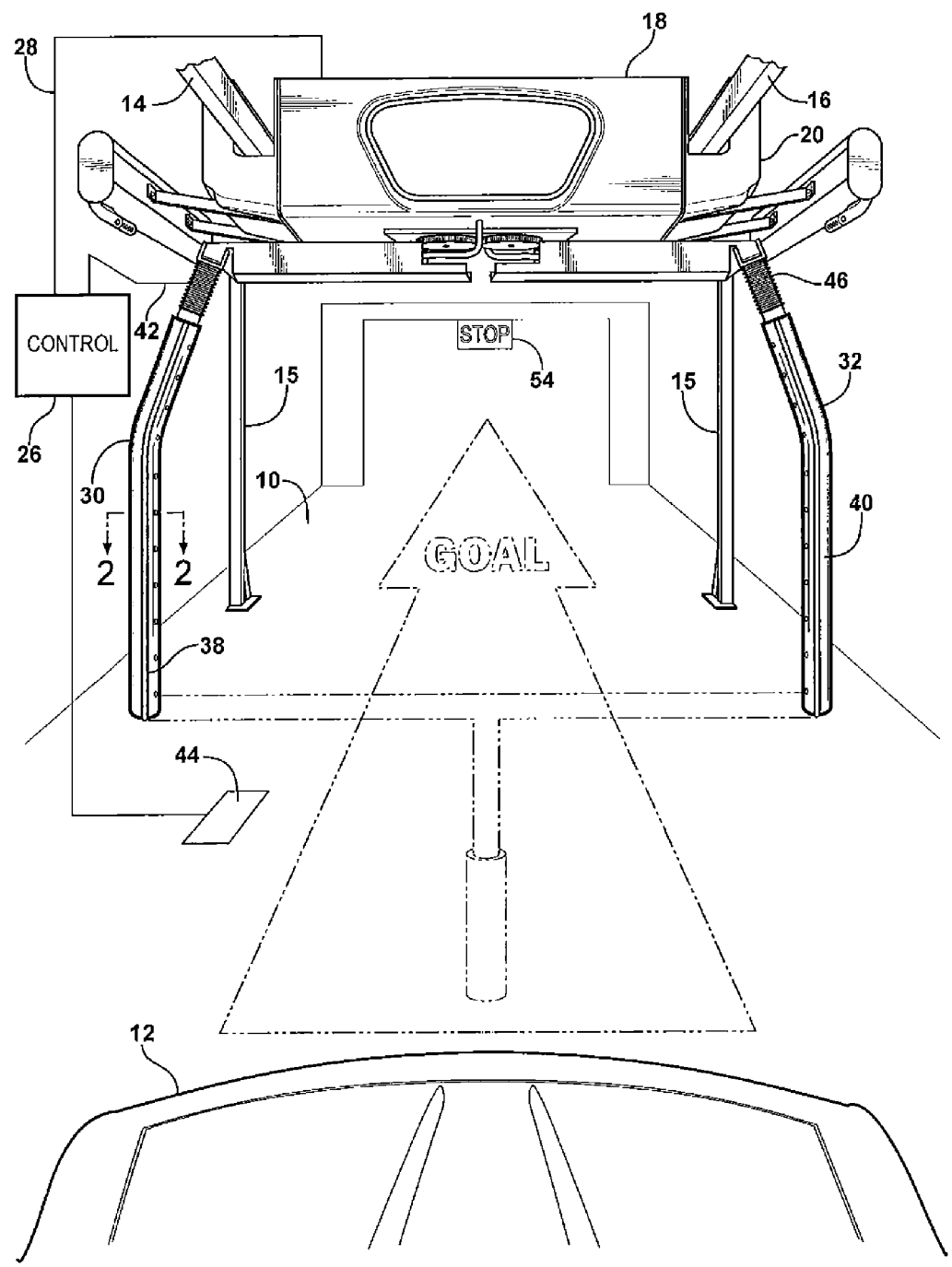
FIG. 1 is a perspective view of a wash bay employing the invention from the vantage point of a vehicle entering the bay.
Figure 2:
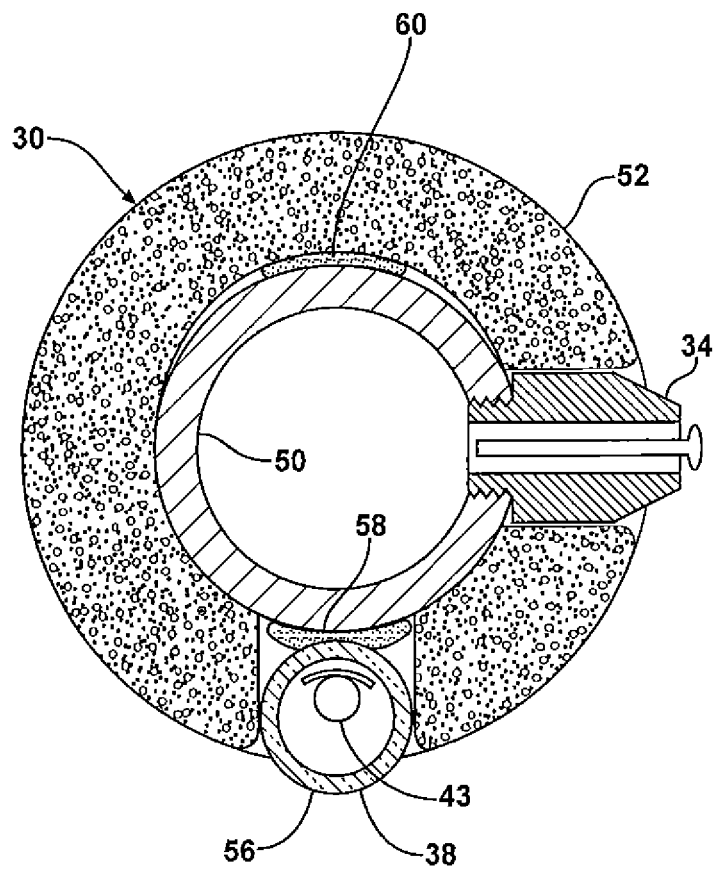
FIG. 2 is a cross-section through one of the spray arms in the system of FIG. 1.

Referring to the drawings, there is shown a wash bay 10 which is long and wide enough to receive a passenger vehicle 12 fully therein; typical dimensions may be on the order of 25 feet long by 10 to 15 feet wide. The wash bay may be partly or fully enclosed or, in warmer climates, may be essentially open.

Mounted overhead of the bay are longitudinally extending, parallel spaced-apart beams 14, 16 of rigid construction, usually aluminum or steel. Beams 14, 16 are held up by vertical posts 15 and/or wall brackets (not shown) so as to support the weight of a carriage 18 bearing appropriate and necessary pumps, valves, relays, motors and other equipment which will be apparent to persons skilled in the car wash arts. The carriage 18 includes a frame 20 having wheels (not shown) which sit on the beams 14, 16, respectively, so that the entire carriage and frame combination 18, 20 can be caused to move in a programmed fashion longitudinally over the wash bay 10 by the computer in a control center 26 which is connected to the carriage 18 by means of a data line 28. In this instance, the carriage 18 is fixed laterally of the frame 20.

Depending from the carriage and pivotally mounted thereto are essentially L-shaped spray arms 30, 32, each of which carries a water supply conduit as hereinafter described. Those conduits are equipped with inwardly-directed nozzles 34 for directing streams of chemical bearing water toward the vehicle 12 after it is suitably positioned and parked in the bay 10. The arms 30, 32 are on the order of 118 inches apart thereby to accommodate between them in non-contacting fashion most standard size passenger vehicles The arms are pivotally movable relative to the carriage 18 in a reversely similar "butterfly" fashion in conjunction with the longitudinal position of the carriage thereby to fully wrap around the vehicle 12 during a wash/rinse process. The nozzles 34 may be attached to the horizontal portions of the arms as well as the vertical portions thereby to wash the horizontal portions of the vehicle as well as all other exterior surface areas. The data line 28 running from the control 26 to the carriage 18 activates a motor (not shown) which drives the arms 30, 32 in mirror-image directions to perform the "butterfly" movements necessary to wash the entire vehicle 12.

When a vehicle approaches the bay 10, the control line 28 is also operable to move the arms 30, 32 to a "parked" position wherein the arms are directly laterally opposite one another so as to essentially frame the bay 10 for entry of the vehicle 12 therebetween. In the parked position, the longitudinal position of the arms 30, 32 may be essentially central of the bay 10 in the longitudinal direction. Switch 44 provides a signal to control 26 to park the arms 30, 32. The arms can also be parked at a forward position and then moved back toward the exit end as the vehicle enters.

In accordance with the invention, elongate tubular lights 38, 40 are attached to and extend along the vertical and substantially vertical portions of the arms 30, 32, respectively and can be operated in an intermittent flashing mode by means of data line 42 extending from the control 26 to the individual light devices.

The individual lights 38, 40 are made up of translucent yellow plastic tubes approximately ¾ inch in outside diameter and carrying within them serially connected high power yellow LEDs 43, preferably in the one-watt range. When illuminated and flashed as described above, the lights 38, 40 which face the driver of the entering vehicle provide a "goalpost" effect which facilitates maneuvering the vehicle into a position substantially centrally of the parked arms without diverting attention away from messages transmitted to the driver by means of a sign 54 which assists the driver in locating the vehicle longitudinally. The sign 54 as well as the flashing of the goalpost lights 38, 40 can be initiated by means of a floor mounted switch 44 at the entry end of the bay 10. The switch 44 is connected to the control 26 in conventional fashion. Yellow is believed to be a highly effective color, but other colors and/or combinations of colors, including white, can also be used.

The arms 30, 32 are reversely similar but are structurally essentially identical. Each arm comprises, as best shown in the cross-sectional view, a steel or cast iron pipe 50 approximately one inch in internal diameter. The pipe is connected through the horizontal portion of the arms to a supply line (not shown) to receive water and chemicals at appropriate pressure levels. A variable speed pump can be used to produce various pressures; i.e., higher pressure for wash and lower pressure for rinse.

Surrounding each conduit 50 is a thick sleeve 52 of extruded foam plastic such as polyethylene. The sleeve 52 acts as a protective cushion to prevent damage to either the conduit or a vehicle in the event of an inadvertent collision between the two. Light tubes 56 are held in gaps which are cut into the cushioning sleeve 52 and filled with a hot melt adhesive 58 to which the light tube is secured. A heater tape is placed between the inside surface of the sleeve 52 and the outside surface of the conduit 50 to prevent freezing when the system is operated in below-freezing temperatures.

Finally, the arms 30, 32 are preferably provided with breakaway mechanisms 46, 48 respectively to allow the arms to swing forward around horizontal axes of rotation in the event of a collision between the vehicle 12 and one of the arms. A suitable breakaway mechanism is fully described in the aforesaid Reissue Pat. No. 40,463, the full disclosure of which is incorporated herein by reference.

As an alternative embodiment, the wash system may have only one arm, such as 30, equipped to travel all around the vehicle. In this arrangement, the arm may be "parked" in the center of the bay (laterally) and at the end of the bay farthest from the entry. The light tube runs down the arm between and around the nozzles to face the driver as he/she enters. Alternatively, one or more light tubes can run down the sides of the single arm and be angled to face the entering vehicle. A goal post effect can be achieved by adding a stationary light post laterally opposite the lighted movable arm.

Figure 3:
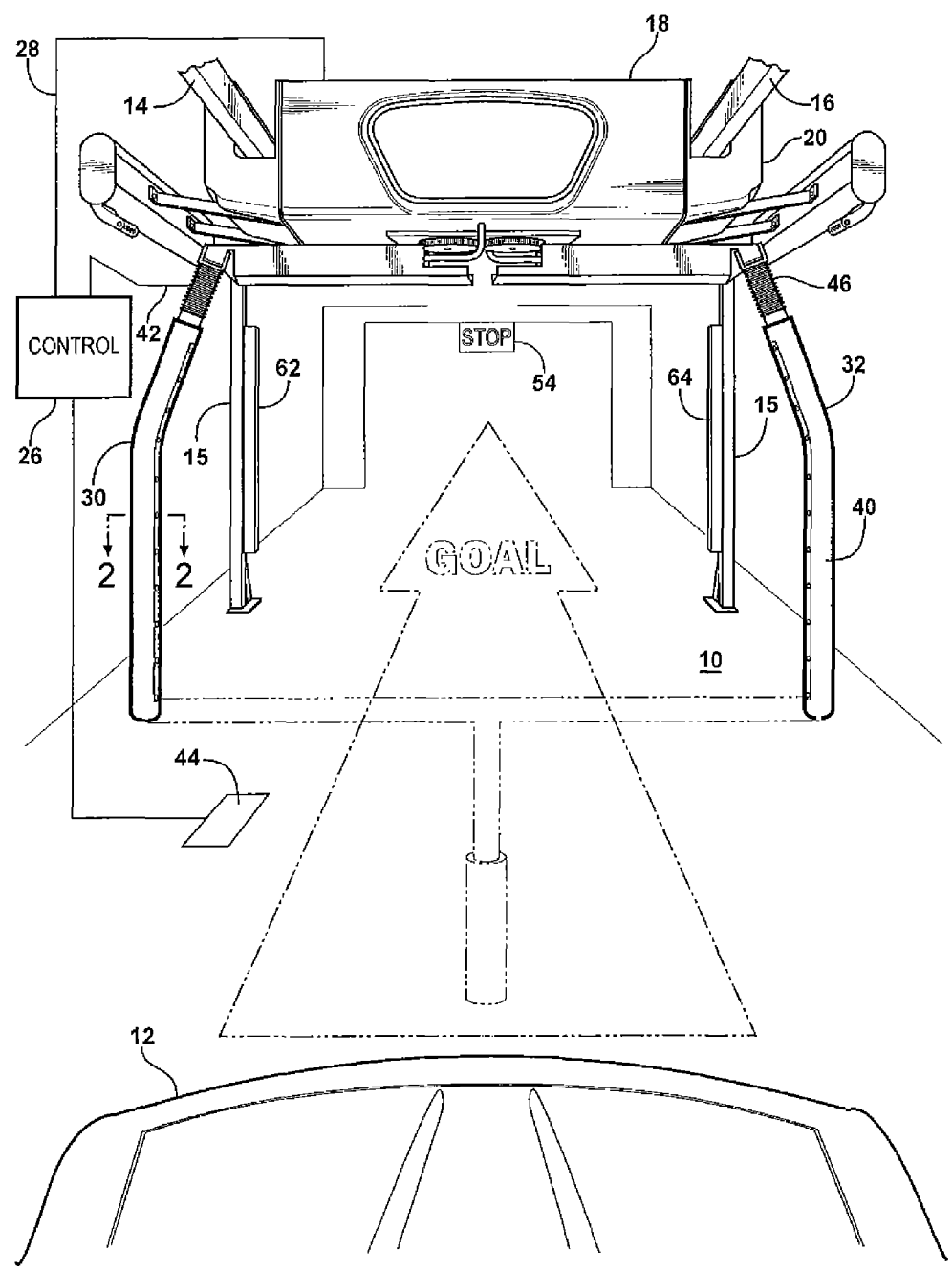
FIG. 3 is a perspective view of an entire system using stationary lights.

FIG. 3 shows another embodiment similar to FIG. 1 and using the same reference numbers for similar parts. In FIG. 3, the light strips 62, 64 are mounted on the sides of stationary poles 15 to provide the goal post effect. Obviously the lights 62, 64 must be far enough apart to allow the arms 30, 32 to pass them without interference.

The method of operating the device described above is essentially as follows:

1. A vehicle 12 approaches the wash bay 10 so as to so as to provide a signal to arm the system by, for example, engaging the floor switch 44;
2. Assuming a twin arm system, the signal from the floor switch 44 acts through the controller 26 to cause the arms 30, 32 to be moved to the parked position; if a single arm system, the arm is moved to a center position unless a second stationary light post is provided in which case, the movable arm is parked laterally across from it.
3. The lights 38, 40 are illuminated by data line 42 and caused to flash producing bright yellow "goalpost" effect lighting which guides the driver to place the vehicle centrally between the goalpost arms 30, 32. If a single arm, the arm serves as a centering target as well as a rough depth gauge. The sign 54 illuminates to tell the driver of the vehicle 12 when to stop; and
4. The wash/rinse cycle then begins wherein the arms 30, 32 are caused to move around the vehicle multiple times to spray the vehicle with prewash, wash, and rinse fluids in accordance with conventional car wash practice.

After the vehicle departs the bay 10 the arm or arms 30, 32 are returned to the parked position.

It will be understood that the system may be equipped with a lateral movement capability as described in the aforementioned Reissue application or, as described herein, may operate without same so as to provide a capital cost savings to the operator and the system. Various other features including coin or token receivers, anti-spotting rinse systems, appropriate floor drains and other features may be provided as will be apparent to persons skilled in the art.

What is claimed is:

1. A spray-type washer for vehicles comprising:
    a rail system extending longitudinally over a wash area;
    a carriage mounted on the rail system for travel therealong;
    an elongate spray arm dependingly mounted from the carriage so as to extend substantially vertically into the wash area for controlled travel relative to a vehicle in the area; said arm comprising a fluid conduit and a plurality of vertically spaced apart nozzles arranged along a vertical axis for directing fluids laterally of the arm toward a vehicle in the wash area;
    a lighting system comprising a plurality of light sources carried by the arm and distributed along substantially the entire vertical length of the arm so as to be capable of producing illumination along substantially the entire vertical length of the arm, wherein the light sources are arranged along a first line and the spaced apart nozzles are arranged along a second line, and wherein the first and second lines do not intersect; and a control system for placing the arm in a target position in the wash area and activating the lighting system to illuminate the arm in response to entry of a vehicle into the wash area.

2. A washer as defined in claim 1 wherein the lighting system includes LEDs.

3. A washer of the type as defined in claim 2 further including means for causing the LEDs to flash.

4. A washer of the type as defined in claim 1 wherein the arm comprises a protective plastic cushion surrounding the conduit over substantially the entire vertical length of the arm.

5. A washer of the type as defined in claim 1 wherein the arm comprises an upper horizontal and a lower vertical portion, the washer further including a two-axis breakaway joint proximate the top of the vertical portion of the arm to allow the arm to swing out of an operative position in the event of a collision between a vehicle and the arm.

6. A washer as defined in claim 1 further including a second spray arm mounted in mirror-image relation to said elongate spray arm and having a series of lighting elements mounted thereon.

7. A spray-type car wash system comprising:
a carriage for translating a vertically oriented spray arm relative to a predefined wash area;
wherein the vertically oriented spray arm is dependingly mounted from the carriage so as to extend substantially vertically into the wash area for controlled travel relative to a vehicle in the area; said arm comprising a fluid conduit and a plurality of vertically spaced apart nozzles arranged along a vertical axis for directing fluids laterally of the arm toward a vehicle in the wash area; and
a lighting system comprising a plurality of light sources carried by the arm and distributed along substantially the entire vertical length of the arm so as to be capable of producing illumination along substantially the entire vertical length of the arm, wherein at least a portion of the light sources and at least a portion of the nozzles are partially enclosed within an outer cushioning sleeve that encloses the fluid conduit of the spray arm.

8. A spray-type car wash system as defined in claim 7 wherein the lighting system comprises a translucent plastic tube extending along the arm and a linear array of light sources within the tube to create illumination visible through the tube.

9. A spray-type car wash system as defined in claim 7 further comprising a controller electrically connected to the lighting system to activate the lighting system upon entry of a vehicle into the wash area.

10. A spray-type car wash system as defined in claim 9 further comprising a vehicle entry detector connected to provide a signal to said controller whereby activation of the lighting system is automatic.

11. A car wash system as defined in claim 7 wherein the spray arm comprises a vertically extending fluid conduit, said nozzles being arranged linearly along said conduit, said lighting system comprising a substantially continuous lighting element extending along and adjacent to said nozzles.

12. A spray-type car wash system as defined in claim 7 wherein the lighting system is such as to create illumination of a color.

13. A spray-type car wash system as defined in claim 7 wherein the spray arm comprises a first substantially horizontal portion pivotally connected to said carriage for controlled rotation about a substantially vertical axis; and
a second substantially vertical portion interconnected with said substantially horizontal portion.

14. A spray-type car wash system as defined in claim 13 further comprising a two-axis breakaway knuckle connected between the horizontal and vertical portions of said spray arm.

15. A spray-type washer for vehicle comprising:
a rail system extending longitudinally over a wash area;
a carriage mounted on the rail system for longitudinal travel therealong;
an elongate spray arm dependingly mounted from the carriage so as to extend substantially vertically into the wash area for controlled travel relative to a vehicle in the area; said arm comprising a fluid conduit and a plurality of vertically spaced apart nozzles arranged along a vertical axis for directing fluids laterally of the arm toward a vehicle in the wash area;
a lighting system comprising a plurality of series connected light sources extending along a substantial majority of the vertical length of the arm so as to be capable of illuminating substantially the vertical length of the arm, wherein the light sources are arranged along a first line and the spaced apart nozzles are arranged along a second line, and wherein the first and second lines do not intersect; and
a control system for activating the lighting system to illuminate the sources such that the illumination is visible to a vehicle driver entering said spray type washer.

16. A spray-type washer as defined in claim 15 further including a vehicle entry sensor connected to provide a vehicle entry signal to said control system to cause said control system to activate the lighting system.

* * * * *